CYLINDRICAL FILM STORAGE DEVICE WITH CIRCUMFERENTIAL CONDUCTOR OVERLAPPING THE FILM EDGE

Filed March 11, 1959

Inventors:
George Richard Hoffman
David Aspinall
By: Stevens, Davis, Miller & Mosher
Attorneys 3,513,450

CYLINDRICAL FILM STORAGE DEVICE WITH CIRCUMFERENTIAL CONDUCTOR OVERLAPPING THE FILM EDGE

George Richard Hoffman, Sale, and David Aspinall, Cheadle, England, assignors, by mesne assignments, to International Business Machines Corporation, New York, N.Y., a corporation of New York Filed Mar. 11, 1959, Ser. No. 798,722
Claims priority, application Great Britain, Mar. 12, 1958, 7,986/58
Int. Cl. G11c *11/14*
U.S. Cl. 340—174 1 Claim

ABSTRACT OF THE DISCLOSURE

A cylindrical thin magnetic film stores a bit of data according to the direction of magnetization in the magnetically closed circumferential path of the film. For a read operation a ribbon like conductor on the outer surface of the film is energized to switch the magnetization orthogonal to the storage direction. For a write operation an axially positioned conductor is energized in a selected polarity with a current overlapping the trailing edge of the ribbon like conductor current.

This invention relates to magnetic storage devices.

There have been described storage systems of the matrix type which comprise a planar array of magnetic film discs formed by evaporation on a suitable base, such as a glass plate. These discs are normally circular having a diameter of the order of 0.5 cm. and thickness less than 10,000 A. Such discs exhibit rectangular hysteresis characteristics since the ratio of their diameter to thickness is high and the demagnetising effect due to the free poles is relatively low.

However, the diameter of such discs cannot be reduced appreciably otherwise the diameter-thickness ratio is lessened to such an extent that the hysteresis rectangularity is seriously reduced. Furthermore, individual discs in an array must be separated by a distance approximately equal to their diameter in order to avoid interaction. In consequence of this spacing of discs in an array, it is found that comparatively long transmission delays occur along common "read" or "inhibit" conductors, which delays are especially undesirable if the switching time along such conductors is required to be very fast.

It is also difficult to ensure that a uniform driving magnetization field is applied to particular discs since practical transmission line system give rise to appreciable fringing, so that the magnetic fields from neighbouring drive conductors may interfere with each other to provide non-uniform magnetic fields in the area of some of the associated discs.

One object of the present invention is to provide an improved magnetic storage device the use of which reduces at least some of the above difficulties.

According to the invention there is provided a magnetic storage device comprising a hollow cylindrical element formed of magnetic material, a conductor passing through said element in a substantially axial direction, and means for producing a magnetising field in an axial direction with respect to said element.

A further object of the invention is to provide an improved and compact magnetic store of the matrix type and accordingly in a further aspect the invention comprises a plurality of hollow cylindrical elements formed of magnetic material and arranged in rows and columns, a plurality of first conductors each associated with a column of said matrix and passing serially through the elements thereof, and a plurality of second conductors each associated with a row of said matrix and wound so as to surround the elements thereof in a circumferential direction.

In order that the present invention may be clearly understood and readily carried into effect, the same will now be more fully described by way of example with reference to the accompanying drawings, in which.

Figure 1:
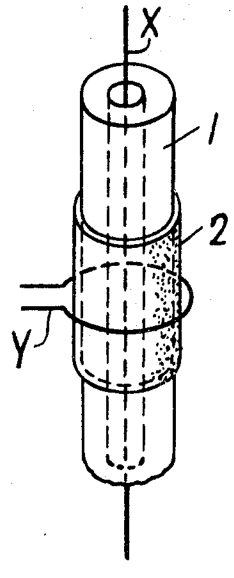
FIG. 1 illustrates a magnetic storage device in accordance with the invention.

In FIG. 1 reference 1 indicates a length of 1 mm. glass tubing on which a film of magnetic material 2 is deposited by evaporation. The magnetic material may be a nickel-iron alloy. A conductor is threaded through the tube and during evaporation a current is passed along this conductor to set up a magnetic field in order to aid the alignment of the atomic structure and produce a strain free film. The tube is also rotated and the whole substrate raised to a temperature of about 300° C. The film may thereafter be trimmed, in this case to a right circular cylinder, by means of normal photo-etching techniques.

It will be noticed that for such a magnetic element the ratio of internal to external diameter is practically unity, even for relatively thick films. For example, this ratio for a film which is 100,000 A. thick on the surface of a glass tube of 1 mm. external diameter is only 102:100 whereas for conventional ferrite cores this ratio is of the order 50:80. If a conductor X is threaded through such an element and a current passed along it a circumferential magnetic field is set up in the element in a direction dependent on that in which the current flows. Since the element is thin compared to its other surface dimensions it exhibits a rectangular hysteresis characteristic, so that a binary digit may be stored as a function of the remanent circumferential magnetic field set up, the significance of the digit, "1" or "0," being determined by the directional convention adopted for the remanent magnetic field which is in turn dependent on the direction of the energising current in conductor X.

Information may be read out of the element 2 by applying a large pulse through a conductor Y passing around the element, as shown, so as to magnetise the element in a direction parallel to its axis. This induces a pulse in conductor X the sense of which is indicative of the previous magnetic state of the element.

Figure 2:
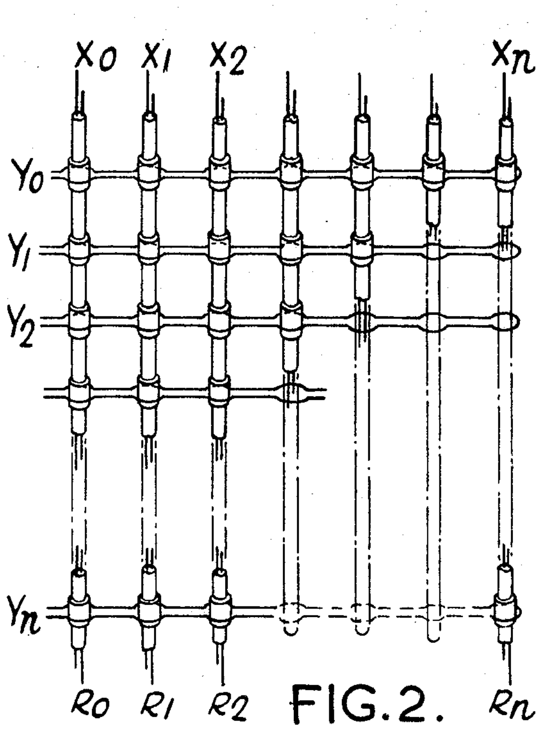
FIG. 2 shows a magnetic storage device of the matrix type comprising elements as described with reference to FIG. 1.

Thus, a matrix store of elements such as just described may be set up as shown by FIG. 2 by evaporating a magnetic film on to a number of lengths of glass tubing 1 and selectively etching away thereafter to leave a number of cylindrical elements on each tube. The different windings through the tubes are denoted by $X_0, X_1, X_2, \ldots X_n$ and those around aligned rows of elements by $Y_0, Y_1, Y_2, \ldots Y_n$. Separate reading output conductors $R_0, R_1, R_2, \ldots R_n$ are employed. It will be seen that information may be stored by applying a combination of pulses to the X-conductors and this information may be subsequently read out by selectively pulsing a Y-conductor to obtain a parallel output from the R-conductors.

Since the R and Y conductors are mutually perpendicular the R conductors are virtually free of stray inductive interference apart from that due to the presence of magnetic film.

It will be clear, however, that operated in this way only one row of information could be successfully stored since further inputs applied to the X-conductors for the purpose of setting up further rows of information would override any information already present. Furthermore, the reading process destroys the information previously set up.

Figures 3, 4:
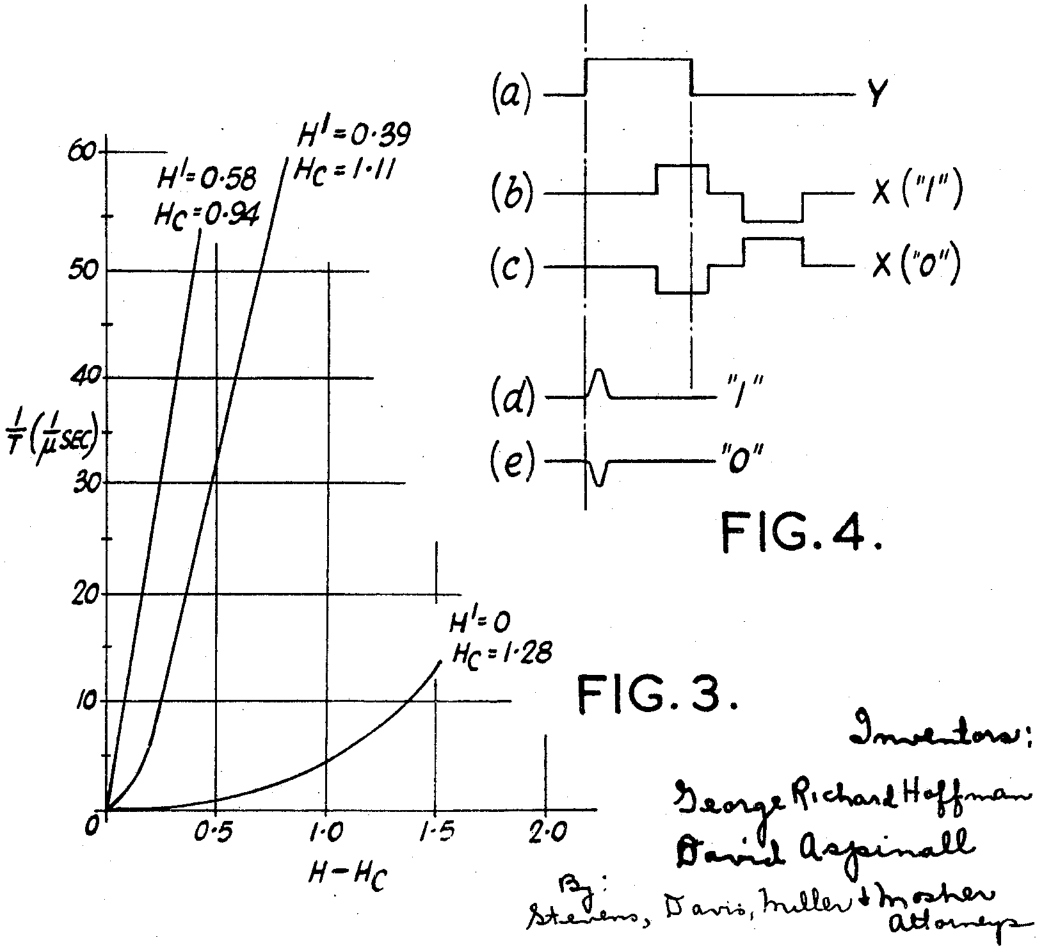
FIG. 3 is illustrative of the operation of the invention.
FIG. 4 illustrates pulse waveforms employed in the operation of the device of FIG. 2.

FIG. 3 is a graphical representation of the relationship between the reciprocal of the switching time T for an element of evaporated magnetic film and the driving ampere turns H, $H_c$ being the coercive force, for various magnetic fields $H^1$ perpendicular to the driving field H.

It will be seen that if no field $H^1$ is applied to the element and the driving field is limited to 1.5 oersted, then these conditions must be maintained for approximately 1 $\mu$s. to obtain a reversal of magnetic store of the element. For periods rather less than 1 $\mu$s. the magnetic state is substantially unchanged.

On the other hand, if for the same driving field, a field $H^1$ is simultaneously applied, then it is possible to reverse the state of the element in a time of the order of ⅕ $\mu$s.

Thus one of the disadvantages of the arrangement of FIG. 2 may be overcome by employing driving currents in the X-conductors of such amplitude that they would if used alone, require approximately 1 $\mu$s. to reverse an element, but maintaining these driving currents for a period of only, say, ⅕ $\mu$s. Simultaneously with the application of these driving currents a current is applied along the Y-conductor associated with the row into which writing is required. Then only that row into which writing is required is subject to both fields H and $H^1$ necessary for setting up information, while the remaining rows are only subject to the field H, which is of insufficient duration to have any substantial effect upon information previously stored in those rows.

Suitable pulse waveforms for application to the conductors Y and the conductors X are illustrated in FIG. 4*a* and FIGS. 4*b* and 4*c*. FIGS. 4*b* and 4*c* are waveforms for setting up a "1" or a "0" respectively. It will be noted that the waveforms of FIGS. 4*b* and 4*c* comprise a square writing pulse, part of which occurs simultaneously with a part of the pulse of FIG. 4*a*, followed by a complementary pulse. These complementary pulses are employed to close any minor hysteresis loops in the storage elements but they are not, in fact, essential to the operation of this example of the invention.

The waveforms of FIG. 4 are shown merely by way of example and any suitable waveform combinations may be employed. For instance, it is not necessary that the writing pulses of FIGS. 4*b* and 4*c* overlap with that of FIG. 4*a* but may occur entirely within the period of that of FIG. 4*a*. Also the waveforms may be other than "square."

Non-destructive reading may be obtained with the present invention by virtue of the fact that due to the evaporation process being performed in a uniform magnetic field the elements are anisotropic. They therefore tend to resist the change from a circumferential magnetisation (produced by the writing pulse on conductor X) to an axial magnetisation as would be produced by applying a large read pulse along a selected Y-conductor. Thus, a suitable read pulse amplitude can be found which gives rise to output pulses in all the R-conductors in parallel but does not change the state of magnetisation of the elements. The states of magnetisation of the elements during such reading start to change to an axial magnetisation but return to their previous circumferential states on termination of the reading pulse. Read pulses may be of similar form to that shown by FIG. 4*a* and FIGS. 4*d* and 4*e* show pulse outputs derived from the R-conductors for a "1" and "0," respectively, which pulses are generated during the leading portion of the read pulse.

It is also found that a magnetic cylinder as described above can be set into what may be termed a neutral state in which the remanent magnetic state is in the direction of the cylinder axis. This neutral state is set up by passing a comparatively large current pulse through the circumferential conductor, this pulse being of such amplitude and duration as to overcome the anisotropic character of the cylinder material.

Once a cylinder is set to this neutral state it can be changed rapidly by the use of a small current pulse applied to the axial conductor to one or other of the information representative states in which the remanent magnetic state is in a circumferential direction. An axial current pulse can be used, as before, which is of so low an energy that any other cylinder to which it is also applied and which is not also in the neutral state is unaffected.

In a further method of operating a storage device as described above a cylinder is first set to the neutral state and information is then written by application of small current pulse to the axial conductor, of the appropriate polarity to change the remanent magnetic state from the axial direction into the circumferential direction representing the desired information. This writing is fast and only requires one small pulse as described above. Also a balanced waveform may be employed since once having set the cylinder to store a particular digit any further writing pulse, in the same or opposite sense, is ineffective.

Reading is performed by setting the cylinder to the neutral state again and the significance of the information read is determined by the polarity of the output pulse which arises as a result of the change which then takes place in remanent magnetic state. This output pulse is large due to the reading pulse being large and effecting a rapid and substantial change of remanent magnetic state. Also the reading operation requires one current pulse input only as does writing and prepares the cylinder for writing at the same time.

In practice it would be possible to use balanced writing pulse waveforms comprising a train of pairs of current pulses of neutrally opposite sense. In this case reading may be performed by applying the reading pulse at a time intermediate two successive balanced writing pulse pairs. If the same information as was read is to be rewritten this is immediately carried out by the writing signal following the reading pulse since the leading pulse of this writing signal will clearly be of the appropriate polarity and any successive pulses will be ineffective. If the information is to be changed in that cylinder then the writing signal pulse train must be inverted.

Thus, although this latter proposal involves destructive reading, it comprises use of one effective current pulse only for reading or writing and generation of large output pulses and would seem to be an attractive alternative to the previously described modes of operation.

In matrix stores such as just described, individual storage elements may be much closer than those in a planar film matrix and in fact, if the spacing of the Y-conductors is appropriately chosen, there is no necessity for separating the magnetic elements from one another physically.

The invention affords the advantage that more cylindrical magnetic elements than disc shaped elements may be produced at a time within the limitations of the evaporation apparatus employed. This is an important consideration since the evaporation process can be tedious and unreliable. In this evaporation process a substantially linear magnetic field is set up in the usual manner to control the alignment of the drifting vapour towards the deposition base, in this case rotating glass tubes. However, a facility is afforded by the present invention in that by energising the axial conductors in the individual tubes during evaporation a very accurate and final alignment of the deposited materialas it reaches the surface may be achieved under the control of the circumferential magnetic fields in the immediate vicinity of the individual tubes.

The initially controlling magnetic field may conveniently be of a radial form with the tubes arranged in an arcuate path.

A number of tubes may be thus employed at a time for the evaporation process. They may be aligned in a parallel array, coupled to drive one another by coupling wheels of silicon rubber, for example, mounted on the ends of each tube, and so be rotated by a common primary drive.

In alternative arrangements the Y-conductors may comprise layers of conductive material deposited underneath or above the magnetic film, thus allowing for individual connection for serial mode reading as well as parallel mode, although the former Y-conductor arrangements may be readily changed to allow for serial mode operation. If the Y-conductors are deposited beneath the magnetic film, then clearly this film must be removed as aforementioned, at least in part, for connection to the conductive layers. Also there must be a non-conductive barrier between the Y-conductor and axial conductor, in this case conveniently formed by the tube.

A further form of Y-conductor which is found very convenient is that of a ribbon-like conductor. This conductor may then be of substantially the same width as the cylinder is deep or, in fact, overlap the ends of the cylinder and so provide a uniform axial magnetic field throughout the cylinder when the conductor is energised. This type of Y-conductor is particularly suitable for use in a storage arrangement according to the invention where the further method of operation involving a neutral magnetisation state is employed.

Similarly the X-conductors may be formed by conductive layers deposited on the tubes beneath the magnetic film, or, the tubes may become redundant by evaporating the magnetic film directly on to the X-conductors.

It is preferable that in the case where the carrier for the magnetic material is not the conductor or conductive that this carrier should be non-magnetic so that the lines of magnetic force generated by the axial conductor are effective in the magnetic material deposited on the carrier.

Clearly, in the above discussion the roles of the axial and circumferential fields may be interchanged so that the direction of the former is used to store binary information. In this case for a matrix arrangement the cylinders must be anisotropic with a preferred direction of magnetisation in the axial sense.

We claim:

1. A bistable magnetic device comprising a discrete uniaxially anisotropic magnetic thin film having a cylindrical shape and a preferred axis of magnetization in the circumferential direction, a first electrical conductor located axially of said cylindrical shape for applying a magnetic field to the film along the preferred axis, a second ribbon-like electrical conductor disposed circumferentially on said film for applying a magnetic field to the film perpendicular to the preferred axis and extending to wholly overlap the film on the two opposite edges thereof, means mounting the first and second conductors inclined to one another across the film, first current supply means selectively to supply first current pulses to said first conductor, and second current supply means selectively to supply to said second conductor second current pulses each of which flows concurrently with a said first pulse and has a trailing edge that occurs before the trailing edge of the said first pulse, each first pulse having a magnitude that is sufficient to effect a change in stable state of magnetization of the film only in the presence of magnetic polarization of the film perpendicular to the preferred axis that results from a said second pulse.

References Cited

UNITED STATES PATENTS

| | | | |
|---|---|---|---|
| 2,792,563 | 5/1957 | Rajchman | 340—174 |
| 2,811,652 | 10/1957 | Lipkin | 340—174 |
| 2,945,217 | 7/1960 | Fisher | 340—174 |
| 2,947,977 | 8/1960 | Bloch | 340—174 |
| 2,877,540 | 3/1959 | Austen | 29—155.5 |
| 3,093,818 | 6/1963 | Hunter | 340—174 |

FOREIGN PATENTS 592,241 9/1947 Great Britain.

JAMES W. MOFFITT, Primary Examiner